(12) United States Patent
Rabinovitch et al.

(10) Patent No.: US 12,535,852 B1
(45) Date of Patent: Jan. 27, 2026

(54) PREEMPTIVE STOPPAGE OF DESIGN CLOCKS FOR PROCESSING BLOCKING DIRECT PROGRAMMING INTERFACE CALLS

(71) Applicant: Synopsys, Inc., Sunnyvale, CA (US)

(72) Inventors: Alexander Rabinovitch, Shrewsbury, MA (US); Baijayanta Ray, Bengaluru (IN)

(73) Assignee: Synopsys, Inc., Sunnyvale, CA (US)

( * ) Notice: Subject to any disclaimer, the term of this patent is extended or adjusted under 35 U.S.C. 154(b) by 61 days.

(21) Appl. No.: 18/751,062

(22) Filed: Jun. 21, 2024

(51) Int. Cl.
*G06F 1/10* (2006.01)
*G06F 9/54* (2006.01)

(52) U.S. Cl.
CPC . *G06F 1/10* (2013.01); *G06F 9/54* (2013.01)

(58) Field of Classification Search
CPC ................ G06F 1/10; G06F 9/44; G06F 1/12
See application file for complete search history.

(56) References Cited

U.S. PATENT DOCUMENTS

2007/0030884 A1\* 2/2007 Miller ................. H04B 1/7183 375/137
2016/0292334 A1\* 10/2016 Rabinovitch ......... G06F 30/331

\* cited by examiner

Primary Examiner — Keshab R Pandey
(74) Attorney, Agent, or Firm — Fenwick & West LLP

(57) ABSTRACT

Preemptive stoppage of design clocks for processing blocking direct programming interface (DPI) calls is described. A blocking DPI call is received at a first field programable gate array (FPGA) of a plurality of FPGAs of an emulation system. The DPI call is received at a system clock cycle, K, of a system clock of the emulation system. Prior to the first FPGA calling the blocking DPI call, an amount of delay, N, associated with the blocking task is determined. The emulation system performs operations to communicate a stop clock instruction to each of a set of FPGAs of the plurality of FPGAs such that design clocks of each of the set of FPGAs are stopped in unison at a system clock cycle of K+N. The emulation system calls the blocking task at a system clock cycle of K+N+1.

20 Claims, 6 Drawing Sheets

400

Receive, at a first field programable gate array (FPGA) of an emulation system, a blocking task at a system clock cycle, K, of a system clock of the emulation system
410

Prior to the first FPGA calling the blocking task, determine an amount of delay, N, associated with the blocking task
420

Perform operations to communicate a stop clock instruction to each of a set of FPGAs of a plurality of FPGAs such that each of the local clocks of each of the set of FPGAs are stopped in unison at a clock cycle of K+N
430

Call the blocking task at a clock cycle of K+N+1
440

PREEMPTIVE STOPPAGE OF DESIGN CLOCKS FOR PROCESSING BLOCKING DIRECT PROGRAMMING INTERFACE CALLS

TECHNICAL FIELD

The present disclosure relates to processing of direct programming interface calls, and specifically to preemptive stoppage of design clocks for processing blocking direct programming interface calls.

BACKGROUND

Emulation is used to verify an integrated circuit design. During an emulation session, some direct programming interface task calls (hardware and/or software) may occur. A direct programming interface call may be used by an emulator system to either fetch data from a host system, or to provide data to the host system. In some instances, if the data is required for subsequent emulation to proceed, some or all of the design clocks are stopped to freeze or halt emulation until the data transfer is complete.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 4 is a flowchart for a method of preemptive stoppage of local field programmable gate array clocks for processing blocking tasks in accordance with some embodiments of the present disclosure.

DETAILED DESCRIPTION

Figure 1:
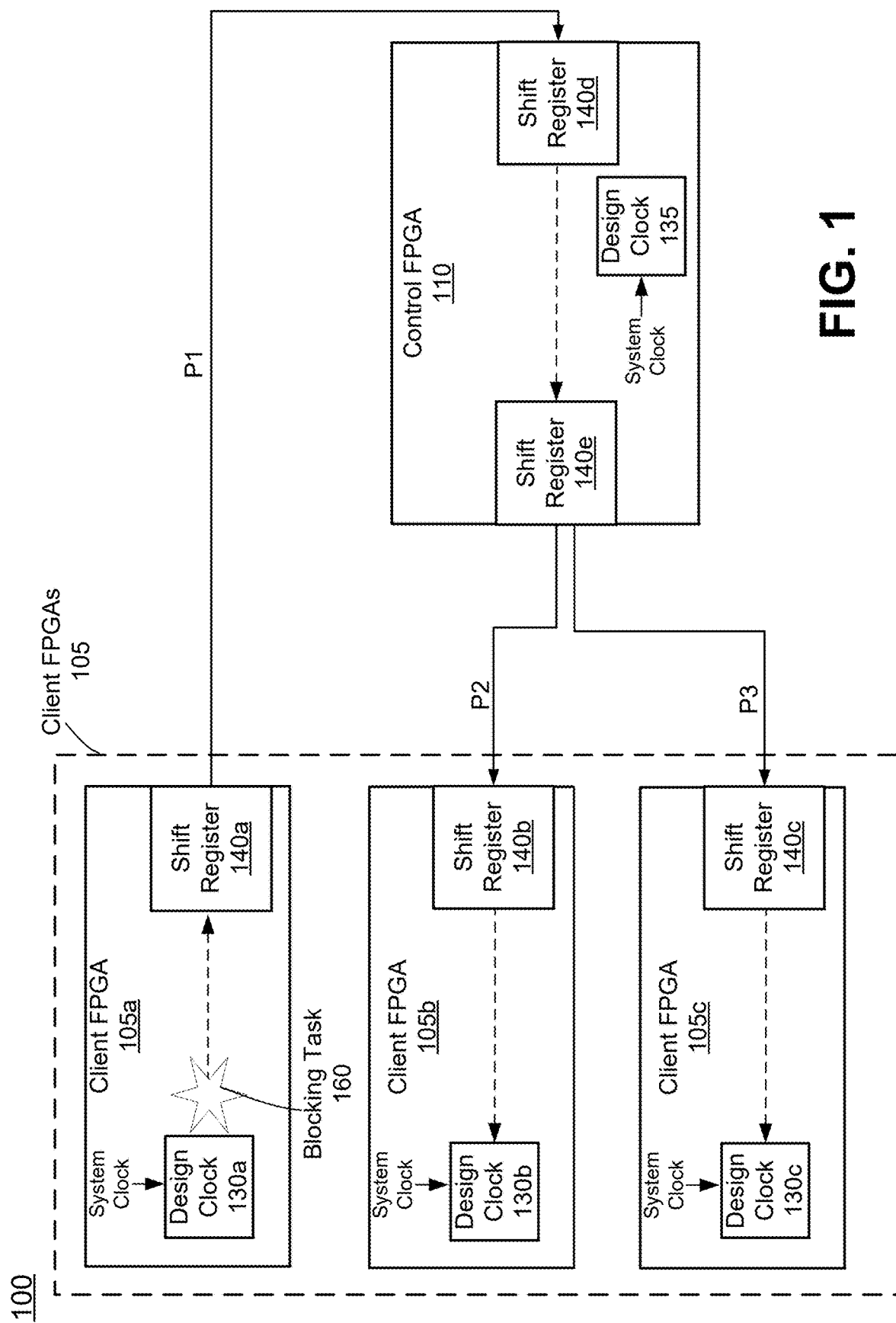
FIG. 1 illustrates an example block diagram for time ordered processing of direct programing interface calls in accordance with some embodiments of the present disclosure.

Aspects of the present disclosure relate to preemptive stoppage of design clocks for processing blocking direct programming interface (DPI) calls. During an emulation session, some hardware and/or software DPI calls from an emulation system to a host system to either fetch data from a host system, or to provide data to the host system. Generally, if the data is required for subsequent emulation to proceed, some or all of the design clocks are stopped to freeze emulation till the data transfer is complete. This type of direct programming interface call is referred to as a blocking (or non-streaming) call. The emulation system may propagate the instruction to stop the design clocks using pathways that couple design clocks of the various field programmable gate arrays that make up the emulation system. The process of stopping design clocks may be initiated immediately in a same driver clock cycle in which a blocking direct programming interface (DPI) call is received. However, stopping design clocks this quickly can be difficult for some emulation systems, in particular for larger and/or more complex emulation systems which may have large and/or complex pathways.

An emulation system is described for preemptive stoppage of design clocks for processing blocking DPI calls. Such blocking DPI calls include, but are not limited to, a blocking import call, a blocking export call, and a buffered DPI call. The emulation system has a system clock that is free running and is not stopped by blocking DPI calls. The system clock may be an auxiliary clock that is free running and may generate a fastest design clock, e.g., always @(posedge sys_clock) if (enable) C<=~C. Stopping of the clocks is about stopping "C", the cycle K at which messages are arriving and pipelining are the cycles of the system clock. A design clock may be the clock for the emulated design.

Blocking DPI calls may be referred to as "blocking tasks." The emulation system uses a plurality of field programable gate arrays (FPGAs) to emulate various components (e.g., integrated circuits, memory, etc.). Each of the FPGAs has a design clock. The emulation system may preemptively stop one or more of the design clocks in accordance with a received blocking task. For example, during an emulation, the emulation system may receive, at a first FPGA of the plurality of FPGAs, a blocking task at a clock cycle K of a system clock of the emulation system, The cycle count, K, is the cycle count of emulation system clock. If the blocking import task is called from DPI export task, the cycle when request to call the export arrives in emulation system is not guaranteed (asynchronous communication from C++ test bench). As a result, if a message to call the export arrives in cycle K, the emulation may determine that it arrived at a later cycle K+N; in this case the export task call will take place at cycle K+N and it shall call in turn the blocking import task at the same cycle. In this case, stopping of the clocks originates in cycle K, so that at cycle K+N the DPI blocking import is called when the clocks are stopped. This allows to perform the operation to stop clocks in N cycles of the system clock), where K may be a time value. Prior to the first FPGA calling the blocking task, the emulation system determines an amount of delay, N, associated with the blocking task, where N may be a number of cycles of the emulation system clock. An operation to stop clocks for the blocking import task may be executed in N cycles. The emulation system performs operations to communicate a stop clock instruction to each of a set of FPGAs of the plurality of FPGAs whose design clocks are to be stopped. Delays induced by, e.g., shift registers and pathways are such that the design clocks of each of the set of FPGAs are stopped in unison at a system clock cycle of K+N. At cycle K+N all clocks may be stopped simultaneously, if a specific design clock is propagated in one FPGA and not propagated in another FPGA during the same cycle, the system may reach an inconsistent state that is not possible in ASIC design being approximated by the emulation. An emulation process calls the blocking task at the subsequent clock cycle (i.e., K+N+1, where 1 represents the next cycle). A blocking task may be evaluated at cycle K+N and the clock may be stopped after that cycle.

Technical advantages of the present disclosure include, but are not limited to, being able to preemptively stop design clocks to process blocking tasks with no or minimal effect on system clock speed. As noted above, an emulation system may stop design clocks in a same time cycle as a blocking task is received. This can be very difficult to do in large emulation systems where instructions have longer distance to travel (i.e., takes more time). As such pathways for design clock instructions in such emulation systems can easily become performance bottlenecks. In contrast, in the present emulation system described herein, once a blocking task is received, it is not immediately called, but instead commences operations to stop design clocks of a set of FPGAs. The operation to stop the design clocks make take multiple system clock cycles, and once complete, the emulation system calls the blocking task. Accordingly, the described emulation system allows multiple system clock cycles to stop the design clocks, such that design of a clock control network (e.g., pathways that interconnect FPGAs and pass instructions that control design clocks) is less likely to be a performance bottleneck.

FIG. 1 illustrates an example block diagram 100 of a portion of an emulation system configured to perform preemptive stoppage of design clocks for processing blocking tasks in accordance with some embodiments of the present disclosure. The block diagram 100 shows an example portion of the emulation system that includes a plurality of FPGAs. It is noted that the disclosed configuration may be applied to an FPGA prototyping system for regions in the prototype that are utilizing a DPI. The emulation system is coupled to a host system (not shown). Alternative embodiments may include more, fewer, or different components from those illustrated in FIG. 1, and the functionality of each component may be divided between the components differently from the description below.

The emulation system executes an emulation session (e.g., referred to as an emulation). During the emulation session, some hardware and/or software blocking task calls may occur. For example, a blocking task may occur from the emulation system to the host system, to either fetch data from the host system, or to provide data to the host system (e.g., import or export calls). The emulation system includes a system clock that is system (i.e., it is not stopped by blocking tasks).

The plurality of FPGAs are used to emulate various components (e.g., memory, integrated circuits, etc.). The plurality of FPGAs include client FPGAs 105 and a control FPGA 110. In the illustrated example, the client FPGAs 105 includes a client FPGA 105a, a client FPGA 105b, and a client FPGA 105c. Note that there are three client FPGAs and a single control FPGA illustrated for simplicity. In practice, there may be many more client FPGAs and/or control FPGAs. Each of the plurality of FPGAs includes a respective design clock. The client FPGA 105a includes a design clock 130a, the client FPGA 105b includes a design clock 130b, the client FPGA 105c includes a design clock 130c, and the control FPGA 110 includes a design clock 135. A design clock may receive input from the system clock of the emulator system. In some embodiments, a design clock is synchronized to the system clock in some manner. The control FPGA 110 controls which design clocks are stopped and for how long. For example, once a stop clock request occurs from a client FPGA (e.g., in response to receiving a blocking task), it is communicated to the control FPGA 110. An FPGA that registers the need to call import DPI from the export may be the FPGA that initiates a multi cycle operation to stop and resume clocks (clocks are resumed when the blocking import DPI has returned its value to the emulator). The control FPGA 110 processes the stop clock request and communicates it out to every FPGA (e.g., may be client FPGAs and/or control FPGAs) whose design clocks are to be stopped in unison such that the blocking task may be processed.

Some or all of the plurality of FPGAs include one or more shift registers that are configured to act as shift register barriers. A shift register barrier is a shift register that is configured to delay a stop clock request and/or a stop clock instruction by some amount. The amount of delay may be determined by a length of the shift register. In some embodiments different shift register barriers may introduce different amounts of delay.

For example, the client FPGA 105a, the client FPGA 105b, and the client FPGA 105c include, respectively, a shift register 140a, a shift register 140b, and a shift register 140c, that are configured to function as shift register barriers. Likewise, the control FPGA 110 includes a shift register 140d and a shift register 140e that are configured to function as shift register barriers. In some embodiments, different shift register barriers may introduce different amounts of delay. For example, the shift register 140a may introduce a different amount of delay than the shift register 140d.

The emulation system is configured such the plurality of FPGAs are coupled together via one or more pathways. The pathways may be, e.g., circuit traces that directly and/or indirectly connect each FPGA to other FPGAs in the emulation system. The pathways may be part of a clock control network of the emulation system. In some embodiments, the pathways are dedicated means for controlling design clocks on the FPGAs. The emulation system may include a shift register barrier at each boundary between a pathway and an FPGA. For example, the shift register 140a and the shift register 140d are boundaries for a pathway P1 that couples the client FPGA 105a and the control FPGA 110. Similarly, the shift register 140b and the shift register 140e are boundaries for a pathway P2 that couples the client FPGA 105b and the control FPGA 110, and the shift register 140c and the shift register 140e are boundaries for a pathway P3 that couples the client FPGA 105c and the control FPGA 110.

In some embodiments (not shown), the emulation system may also include shift registers at boundaries between super logic regions (SLRs) and pathways. If multiple shift registers are present on same path P, the registers may divide the path into roughly equal sections (each section must propagate within 1 period of the system clock). Typically, this effect may be achieved by placing the registers on FPGA boundaries. At times it may be beneficial to place the shift registers onto a SLR boundary to cut a long path within FPGA into sections.

The emulation system sets the values of the shift register barriers (e.g., the shift registers 140a, 140b, 140c, 104d, 140e) such that, for a given clock control path, they have a total delay of $N_{adj}$, where $N_{adj}$ is a number of system clock cycles. A clock control path is a path from a FPGA receiving a blocking task to a corresponding control FPGA (e.g., the control FPGA 110) and to a FPGA (e.g., the client FPGA 105b, the client FPGA 105c) affected by the blocking task. There may be multiple clock control paths in the emulation system. Each clock control path includes one or more pathways (e.g., P1, P2, etc.), and may also include one or more shift register barriers (e.g., this shift register 140a, the shift register 140d, etc.). In some embodiments, $N_{adj}$ is determined by:

$$N_{adj} = \text{floor}(N * T_{Sys\ Clk} - T_{Fixed}) \quad (1)$$

In equation (1), the "floor" function takes an input number, and gives as an output a greatest integer that is less than or equal to the input number, N is a delay in stopping a design clock, $T_{Sys\ Clk}$ is a period of the system clock, and $T_{Fixed}$ is a total cable and time division multiplexing (TDM) delay in the pathway. Once $N_{adj}$ is determined, for a clock control path, delays for shift register barriers in the clock control path may be determined such that they total $N_{adj}$. Note that different clock control paths may have shift register barriers configured to provide different delay values. The length of some or all of the shift register barriers may be set to a maximum value at compile, and adjusted at runtime after post place and route (PNR) system level timing is established.

Note that in some embodiments, there may not be a target frequency for the system clock, but instead a design target may be to determine a maximum frequency for the system clock. In these cases, a maximum frequency for the system clock may be determined by:

$$F_{max} = \left(\text{ceiling}\left(\frac{T_{Fixed}}{N - N_{Barr}}\right)\right)^{-1} \quad (2)$$

In equation (2), the "ceiling" function takes an input number, and gives as an output a greatest integer that is greater than or equal to the input number, and $N_{Barr}$ is a total number of shift register barriers—assuming each has a depth of 1 (e.g., delays by 1 system clock cycle). For example, if there is a lower bound on the period of the system clock, then the frequency is at most 1 divided by that period.

The emulation system may receive a blocking task 160 during the emulation. For example, the client FPGA 105a may receive the blocking task 160 at a clock cycle, K, of the system clock.

Prior to the first FPGA calling the blocking task 160, the emulation system determines determining the amount of delay, N, associated with the blocking task. It is noted that N is usually a small integer (2-4) that ensures that the contribution of the operation to stop the clocks is no longer the performance bottleneck for the period of the system clock. In some embodiments, the emulation system may receive an instruction from a host system an instruction to set the amount of delay to N. The emulation system may then set shift register lengths in some or all of the plurality of FPGAs such that a total delay between receiving a blocking task and stopping design clocks of each of the set of FPGAs in unison is K+N.

The emulation system performs operations to communicate a stop clock instruction to each of a set of the plurality of FPGAs such that each of the design clocks of the set of FPGAs are stopped at a clock cycle of K+N. For example, responsive to receiving the blocking task, the client FPGA 105a may communicate a stop clock request to the control FPGA 110 via the pathway P1. Note that the stop clock request is delayed by the shift register 140a and the shift register 140d as well as some cable and TDM delays. Responsive to receiving the stop clock request, the control FPGA 110 generates the stop clock instruction for a set of one or more client FPGAs that it controls whose clocks should be stopped based in part on the blocking task. For example, in the illustrated embodiment, the control FPGA 110 communicates the stop clock instruction to the client FPGA 105b and the client FPGA 105c. While not shown, in some embodiments, the control FPGA 110 may control other client FPGAs whose purpose/operations do not affect the execution of the blocking task, and as such a stop clock instruction is not sent to these other client FPGAs.

The control FPGA 110 may generate a response for the FPGA 105a. The control FPGA 110 may provide (not shown for simplicity) the response back to the shift register 140d, and the response propagates back through the pathway P1 and the shift register 140a, being delayed by both, back to the client FPGA 105a. The response may cause the FPGA 110 to call the blocking task at a clock cycle of K+N+1. It is noted that the paths augmented with shift registers are responsible to stop and resume clocks. The task will be called at cycle K+N by introducing a local delay of N cycles, so that it does not need to rely on the clock control network. The objective of the response within the network is to ensure that during cycle K+N+1 the clocks are not advancing.

The stop clock instruction to the client FPGA 105b is delayed by the shift register 140e and the shift register 140b as well as cable and TDM delays, likewise, the stop clock instruction to the client FPGA 105c is delayed by the shift register 140e and the shift register 140c as well as cable as TDM delays. In this manner, a total delay from when the block task is received, and when the set of client FPGAs receives the stop clock instruction and stops their respective design clocks in unison is at a clock cycle of K+N. The client FPGA 105a may then call the blocking task 160 at the clock cycle of K+N+1. When the blocking DPI import task returns a value from the host, the same network that was used to stop clocks shall be used to resume clocks as N-cycle operation.

There are multiple example usage scenarios of blocking tasks that can be handled in the above manner. For example, in some instances a blocking task may be a blocking import DPI call. A blocking import DPI call (e.g., function implemented in C++ called from SystemVerilog resulting in transfer of data from the emulator system to the host system) in response to an asynchronous export call (e.g., function/tasks implemented in Verilog and called from C++, resulting in transfer of data from the host system to the emulator system). Note that since the system clock cycle in which data transfer from the host system to the emulator system is asynchronous, the emulator system does not know exactly when the data should arrive. As such, once this type of blocking task is received, the emulation system can preemptively stop design clocks of FPGAs without significant loss in throughput.

And in some embodiments, blocking tasks (e.g., a blocking export call) either from the emulator system to the host system or from the host system to the emulator system can be buffered to any extent. In these cases, the clock stopping request can hence be served with a delay that is equal to less than the acceptable buffer delay. For example, even though the task may be considered blocking, if the task call is in response to another task that is non-blocking, e.g., an unexpected export, the overall combination of two tasks may be served with an arbitrary delay.

Figure 2:
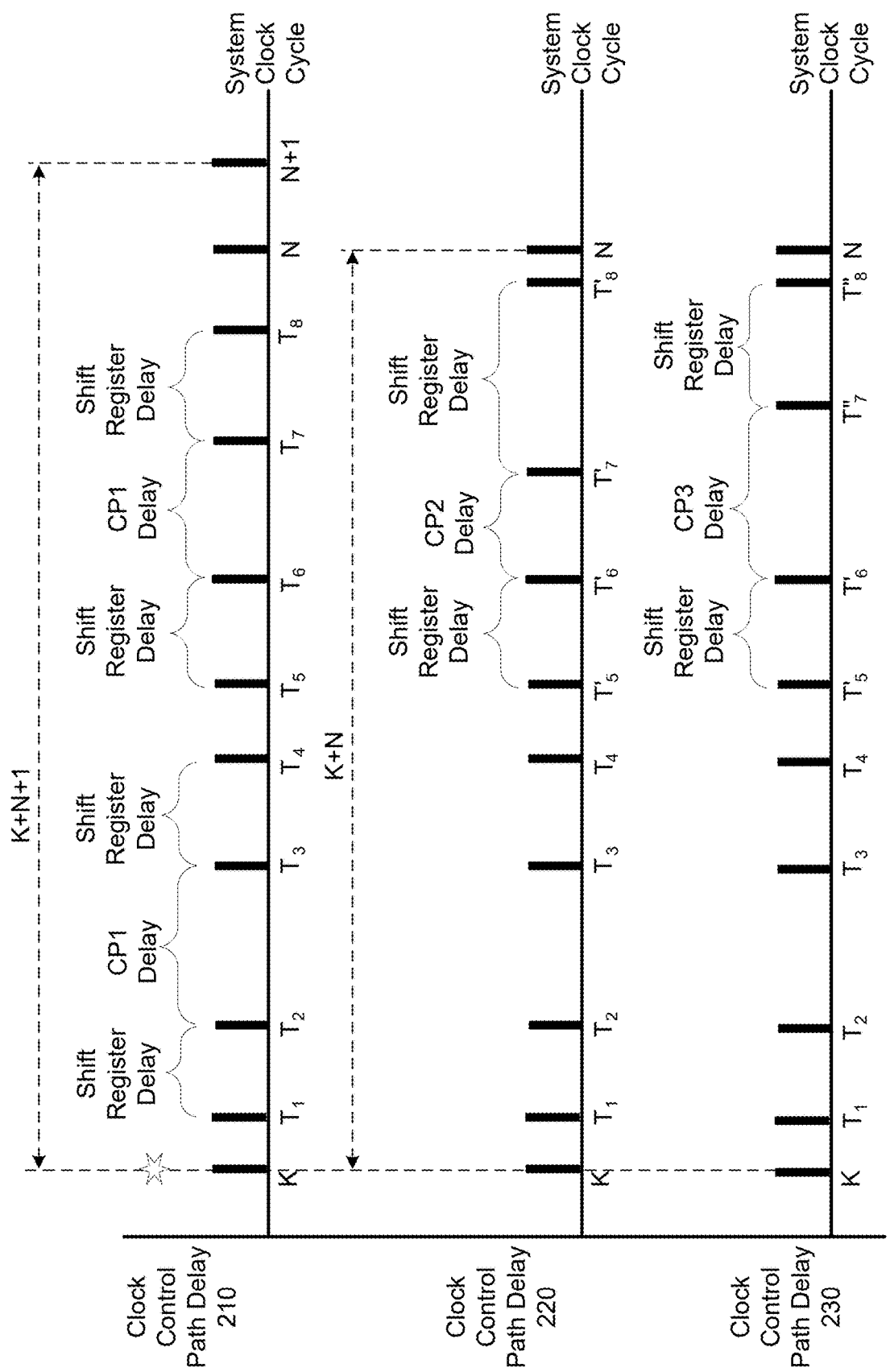
FIG. 2 illustrates example timing diagrams showing instruction path delays for the portion of the emulation system of FIG. 1.

Referring now to FIG. 2, example timing diagrams showing instruction path delays for the portion of the emulation system of FIG. 1 are illustrated. The timing diagrams include a timing diagram for a clock control path delay 210, a timing diagram for a clock control path delay 220, and a timing diagram for a clock control path delay 230.

The clock control path delay 210 describes the various delays associated with a clock control path (e.g., P1) that couples the client FPGA 105a to the control FPGA 110. The client FPGA 105a receives the blocking task 160 at a clock cycle K. Responsive to receiving the blocking task, the client FPGA 105a generates a stop clock request that is provided to the shift register 140 at time $T_1$. A difference between $T_1$ and K corresponds to times taken for generation of the stop clock request and transmission of it to the shift register 140*a*. The shift register 140*a* is configured to introduce an amount of delay that corresponds to a difference in $T_2$ and $T_1$, where $T_2$ is a time when the shift register 140*a* outputs the stop clock request to the pathway P1.

The stop clock request message (or instruction) is received at a shift register 140*d* of the control FPGA 110 at time $T_3$, such that the stop clock instruction is delayed by a time period (CP1 delay) corresponding to a difference between $T_3$ and $T_2$. The shift register 140*d* is configured to introduce an amount of delay that corresponds to a difference in time $T_4$ and $T_3$, where $T_4$ is a time when the shift register 140*d* outputs the stop clock request. A difference between $T_5$ and $T_4$ corresponds to times taken for internal processing of the stop clock request, generation of stop clock instructions for a set of FPGAs affected by the blocking task, generation of a response to the client FPGA 105*a*, and transmission to the shift registers to output the stop clock request (as described below with regard to the instruction path delays 220, 230) and the response.

The control FPGA 110 may provide the response back to the shift register 140*d*, and the response propagates back through the pathway P1. In the illustrated embodiment, the amount of delay introduced on the return path to the client FPGA 105*a* corresponds to a time period of $T_8$-$T_5$, which is substantially the same as a time period $T_4$-$T_1$. In other embodiments (not shown) a different return path may be used by the control FPGA 110 that may have introduce different delays. The client FPGA 105*a* processes the received response and calls the blocking task at clock cycle of N+1. A client FPGA that originated the logical request to stop clocks may count N cycles internally and stop its local clocks. It does not require feedback from control FPGA for this as such feedback from the control FPGA may be required only if another client FPGA can initiate stopping of the clocks.

The clock control path delay 220 describes the various delays associated with a clock control path that couples the client FPGA 105*a* to the client FPGA 105*b*. The delays described above for the clock control path delay 210 are substantially the same up until the control FPGA 110 generates the stop clock instruction for the client FPGA 105*b*. The control FPGA 110 provides the stop clock instruction to the shift register 140*e* at a time $T_5'$. The shift register 140*e* is configured to introduce an amount of delay that corresponds to a difference in $T_6'$ and $T_5'$, where $T_6'$ is a time when the shift register 140*e* outputs the stop clock instruction to the pathway P2.

The stop clock request instruction is received at a shift register 140*b* of the client FPGA 105*b* at time $T_7'$, such that the stop clock instruction is delayed by a time period (CP2 delay) corresponding to a difference between $T_7'$ and $T_6'$. The shift register 140*b* is configured to introduce an amount of delay that corresponds to a difference in time $T_8'$ and $T_7'$, where $T_8'$ is a time when the shift register 140*b* outputs the stop clock instruction. The client FPGA 105*b* processes the received stop clock instruction and stops the design clock 130*b* of the client FPGA 105*b* at a clock cycle of N+K.

The clock control path delay 230 describes the various delays associated with a clock control path that couples the client FPGA 105*a* to the client FPGA 105*c*. The delays described above for the clock control path delay 210 are substantially the same up until the control FPGA 110 generates the stop clock instruction for the client FPGA 105*c*. The control FPGA 110 provides the stop clock instruction to the shift register 140*e* at a $T_5'$. The shift register 140*e* is configured to introduce an amount of delay that corresponds to a difference in $T_6'$ and $T_5'$, where $T_6'$ is a time when the shift register 140*e* outputs the stop clock instruction to the pathway P3. While this embodiment uses the shift register 140*e* to delay stop clock instructions for both the client FPGA 105*b* and the client FPGA 105*c*, in other embodiments, the control FPGA 110 may use a different shift register to delay stop clock instructions for each of the client FPGAs.

The stop clock instruction is received at a shift register 140*c* of the client FPGA 105*c* at time $T_7''$, such that the stop clock instruction is delayed by a time period corresponding to difference between $T_7''$ and $T_6'$. The shift register 140*c* is configured to introduce an amount of delay that corresponds to a difference in time $T_8''$ and $T_7''$, where $T_8''$ is a time when the shift register 140*c* outputs the stop clock instruction. The client FPGA 105*c* processes the received stop clock instruction and stops the design clock 130*c* of the client FPGA 105*b* at a clock cycle of K+N. In this manner, the design clocks of the FPGAs affected by a blocking task can be stopped in unison at a same clock cycle, before a blocking task is actually called.

Note that in the illustrated embodiment, the delays introduced by the pathways P1, P2, and P3 are different from each other. In some embodiments (not shown), some or all of the pathways between FPGAs may have a same delay value. Likewise, delays introduced by some of the shift registers may be different from each other. For each clock control path delay (e.g., 200, 210, 220), the delays for the shift registers that operate as part of that clock control path have delays determined using equation 1 such that a sum of the delays introduced by the shift registers are $N_{adj}$.

Figure 3:
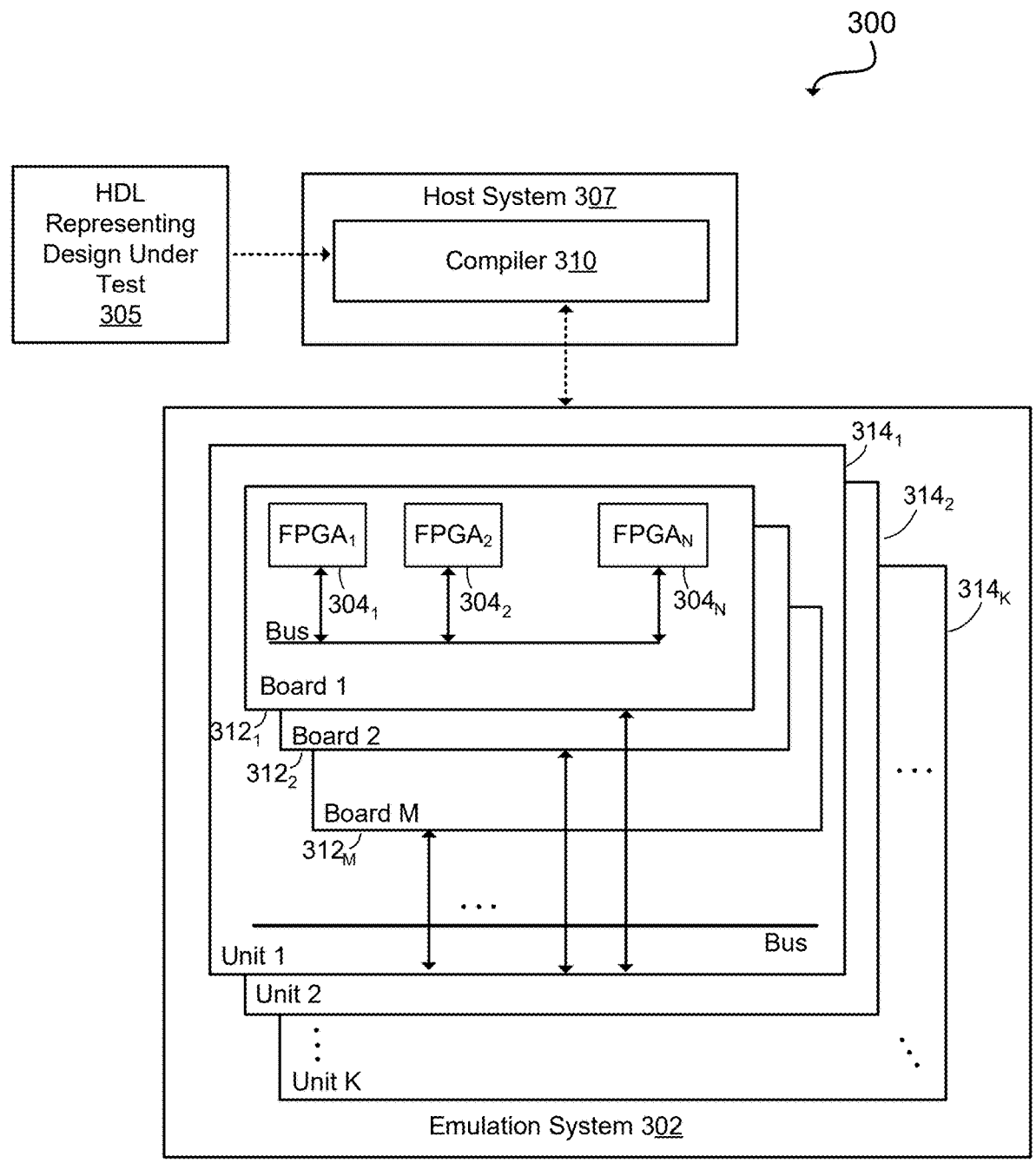
FIG. 3 depicts a diagram of an example emulation system in accordance with some embodiments of the present disclosure.

FIG. 3 depicts a diagram of an example emulation environment 300. An emulation environment 300 may be configured to verify the functionality of the circuit design. The emulation environment 300 may include a host system 307 (e.g., a computer that is part of an EDA system) and an emulation system 302 (e.g., a set of programmable devices such as Field Programmable Gate Arrays (FPGAs) or processors). The host system discussed in FIG. 1 is an embodiment of the host system 307, and the emulation system described above with regard to FIGS. 1-2 is an embodiment of the emulation system 302. The host system 307 generates data and information by using a compiler 310 to structure the emulation system to emulate a circuit design. A circuit design to be emulated is also referred to as a Design Under Test ('DUT') where data and information from the emulation are used to verify the functionality of the DUT. It is noted that the shift registers me be fixed, such that regardless of origin to stop the clocks the operation to stop takes place in exactly N cycles and the location of shift registers minimizes the overall impact on the period of the fast emulation clock (a propagation path between consecutive shift registers must finish in one period of the fast clock).

The host system 307 may include one or more processors. In the embodiment where the host system includes multiple processors, the functions described herein as being performed by the host system can be distributed among the multiple processors. The host system 307 may include a compiler 310 to transform specifications written in a description language that represents a DUT and to produce data (e.g., binary data) and information that is used to structure the emulation system 302 to emulate the DUT. The compiler 310 can transform, change, restructure, add new functions to, and/or control the timing of the DUT.

The host system 307 and emulation system 302 exchange data and information using signals carried by an emulation connection. The connection can be, but is not limited to, one or more electrical cables such as cables with pin structures compatible with the Recommended Standard 232 (RS232) or universal serial bus (USB) protocols. The connection can be a wired communication medium or network such as a local area network or a wide area network such as the Internet. The connection can be a wireless communication medium or a network with one or more points of access using a wireless protocol such as BLUETOOTH or IEEE 802.11. The host system 307 and emulation system 302 can exchange data and information through a third device such as a network server.

The emulation system 302 includes multiple FPGAs (or other modules) such as FPGAs $304_1$ and $304_2$ as well as additional FPGAs to $304_N$. Each FPGA can include one or more FPGA interfaces through which the FPGA is connected to other FPGAs (and potentially other emulation components) for the FPGAs to exchange signals. An FPGA interface can be referred to as an input/output pin or an FPGA pad. While an emulator may include FPGAs, embodiments of emulators can include other types of logic blocks instead of, or along with, the FPGAs for emulating DUTs. For example, the emulation system 302 can include custom FPGAs, specialized ASICs for emulation or prototyping, memories, and input/output devices.

A programmable device can include an array of programmable logic blocks and a hierarchy of interconnections that can enable the programmable logic blocks to be interconnected according to the descriptions in the HDL code. Each of the programmable logic blocks can enable complex combinational functions or enable logic gates such as AND, and XOR logic blocks. In some embodiments, the logic blocks also can include memory elements/devices, which can be simple latches, flip-flops, or other blocks of memory. Depending on the length of the interconnections between different logic blocks, signals can arrive at input terminals of the logic blocks at different times and thus may be temporarily stored in the memory elements/devices.

FPGAs $304_1$-$304_N$ may be placed onto one or more boards $312_1$ and $312_2$ as well as additional boards through $312_M$. Multiple boards can be placed into an emulation unit $314_1$. The boards within an emulation unit can be connected using the backplane of the emulation unit or any other types of connections. In addition, multiple emulation units (e.g., $314_1$ and $314_2$ through $314_K$) can be connected to each other by cables or any other means to form a multi-emulation unit system. Some or all of the FPGAs may include shift registers configured to function as shift register barriers as described above with regard to FIGS. 1-2.

For a DUT that is to be emulated, the host system 307 transmits one or more bit files to the emulation system 302. The bit files may specify a description of the DUT and may further specify partitions of the DUT created by the host system 307 with trace and injection logic, mappings of the partitions to the FPGAs of the emulator, and design constraints. Using the bit files, the emulator structures the FPGAs to perform the functions of the DUT. In some embodiments, one or more FPGAs of the emulators may have the trace and injection logic built into the silicon of the FPGA. In such an embodiment, the FPGAs may not be structured by the host system to emulate trace and injection logic.

The host system 307 receives a description of a DUT that is to be emulated. In some embodiments, the DUT description is in a description language (e.g., a register transfer language (RTL)). In some embodiments, the DUT description is in netlist level files or a mix of netlist level files and HDL files. If part of the DUT description or the entire DUT description is in an HDL, then the host system can synthesize the DUT description to create a gate level netlist using the DUT description. A host system can use the netlist of the DUT to partition the DUT into multiple partitions where one or more of the partitions include trace and injection logic. The trace and injection logic traces interface signals that are exchanged via the interfaces of an FPGA. Additionally, the trace and injection logic can inject traced interface signals into the logic of the FPGA. The host system maps each partition to an FPGA of the emulator. In some embodiments, the trace and injection logic is included in select partitions for a group of FPGAs. The trace and injection logic can be built into one or more of the FPGAs of an emulator. The host system can synthesize multiplexers to be mapped into the FPGAs. The multiplexers can be used by the trace and injection logic to inject interface signals into the DUT logic.

The host system creates bit files describing each partition of the DUT and the mapping of the partitions to the FPGAs. For partitions in which trace and injection logic are included, the bit files also describe the logic that is included. The bit files can include place and route information and design constraints. The host system stores the bit files and information describing which FPGAs are to emulate each component of the DUT (e.g., to which FPGAs each component is mapped).

Upon request, the host system transmits the bit files to the emulator. The host system signals the emulator to start the emulation of the DUT. During emulation, the emulation system 302 may process blocking tasks (e.g., as described above with regard to FIGS. 1-2). During emulation of the DUT or at the end of the emulation, the host system receives emulation results from the emulator through the emulation connection. Emulation results are data and information generated by the emulator during the emulation of the DUT which include interface signals and states of interface signals that have been traced by the trace and injection logic of each FPGA. The host system can store the emulation results and/or transmits the emulation results to another processing system.

After emulation of the DUT, a circuit designer can request to debug a component of the DUT. If such a request is made, the circuit designer can specify a time period of the emulation to debug. The host system identifies which FPGAs are emulating the component using the stored information. The host system retrieves stored interface signals associated with the time period and traced by the trace and injection logic of each identified FPGA. The host system signals the emulator to re-emulate the identified FPGAs. The host system transmits the retrieved interface signals to the emulator to re-emulate the component for the specified time period. The trace and injection logic of each identified FPGA injects its respective interface signals received from the host system into the logic of the DUT mapped to the FPGA. In case of multiple re-emulations of an FPGA, merging the results produces a full debug view.

The host system 307 receives, from the emulation system, signals traced by logic of the identified FPGAs during the re-emulation of the component. The host system 307 stores the signals received from the emulator. The signals traced during the re-emulation can have a higher sampling rate than the sampling rate during the initial emulation. For example, in the initial emulation a traced signal can include a saved state of the component every X milliseconds. However, in the re-emulation the traced signal can include a saved state every Y milliseconds where Y is less than X. If the circuit designer requests to view a waveform of a signal traced during the re-emulation, the host system can retrieve the stored signal and display a plot of the signal. For example, the host system can generate a waveform of the signal. Afterwards, the circuit designer can request to re-emulate the same component for a different time period or to re-emulate another component.

A host system 307 and/or the compiler 310 may include sub-systems such as, but not limited to, a design synthesizer sub-system, a mapping sub-system, a run time sub-system, a results sub-system, a debug sub-system, a waveform sub-system, and a storage sub-system. The sub-systems can be structured and enabled as individual or multiple modules or two or more may be structured as a module. Together these sub-systems structure the emulator and monitor the emulation results.

The design synthesizer sub-system transforms the HDL that is representing a DUT 305 into gate level logic. For a DUT that is to be emulated, the design synthesizer sub-system receives a description of the DUT. If the description of the DUT is fully or partially in HDL (e.g., RTL or other level of representation), the design synthesizer sub-system synthesizes the HDL of the DUT to create a gate-level netlist with a description of the DUT in terms of gate level logic.

The mapping sub-system partitions DUTs and maps the partitions into emulator FPGAs. The mapping sub-system partitions a DUT at the gate level into a number of partitions using the netlist of the DUT. For each partition, the mapping sub-system retrieves a gate level description of the trace and injection logic and adds the logic to the partition. As described above, the trace and injection logic included in a partition is used to trace signals exchanged via the interfaces of an FPGA to which the partition is mapped (trace interface signals). The trace and injection logic can be added to the DUT prior to the partitioning. For example, the trace and injection logic can be added by the design synthesizer sub-system prior to or after the synthesizing the HDL of the DUT.

In addition to including the trace and injection logic, the mapping sub-system can include additional tracing logic in a partition to trace the states of certain DUT components that are not traced by the trace and injection. The mapping sub-system can include the additional tracing logic in the DUT prior to the partitioning or in partitions after the partitioning. The design synthesizer sub-system can include the additional tracing logic in an HDL description of the DUT prior to synthesizing the HDL description.

The mapping sub-system maps each partition of the DUT to an FPGA of the emulator. For partitioning and mapping, the mapping sub-system uses design rules, design constraints (e.g., timing or logic constraints), and information about the emulator. For components of the DUT, the mapping sub-system stores information in the storage sub-system describing which FPGAs are to emulate each component.

Using the partitioning and the mapping, the mapping sub-system generates one or more bit files that describe the created partitions and the mapping of logic to each FPGA of the emulator. The bit files can include additional information such as constraints of the DUT and routing information of connections between FPGAs and connections within each FPGA. The mapping sub-system can generate a bit file for each partition of the DUT and can store the bit file in the storage sub-system. Upon request from a circuit designer, the mapping sub-system transmits the bit files to the emulator, and the emulator can use the bit files to structure the FPGAs to emulate the DUT.

If the emulator includes specialized ASICs that include the trace and injection logic, the mapping sub-system can generate a specific structure that connects the specialized ASICs to the DUT. In some embodiments, the mapping sub-system can save the information of the traced/injected signal and where the information is stored on the specialized ASIC.

The run time sub-system controls emulations performed by the emulator. The run time sub-system can cause the emulator to start or stop executing an emulation. Additionally, the run time sub-system can provide input signals and data to the emulator. The input signals can be provided directly to the emulator through the connection or indirectly through other input signal devices. For example, the host system can control an input signal device to provide the input signals to the emulator. The input signal device can be, for example, a test board (directly or through cables), signal generator, another emulator, or another host system.

The results sub-system processes emulation results generated by the emulator. During emulation and/or after completing the emulation, the results sub-system receives emulation results from the emulator generated during the emulation. The emulation results include signals traced during the emulation. Specifically, the emulation results include interface signals traced by the trace and injection logic emulated by each FPGA and can include signals traced by additional logic included in the DUT. Each traced signal can span multiple cycles of the emulation. A traced signal includes multiple states and each state is associated with a time of the emulation. The results sub-system stores the traced signals in the storage sub-system. For each stored signal, the results sub-system can store information indicating which FPGA generated the traced signal.

The debug sub-system allows circuit designers to debug DUT components. After the emulator has emulated a DUT and the results sub-system has received the interface signals traced by the trace and injection logic during the emulation, a circuit designer can request to debug a component of the DUT by re-emulating the component for a specific time period. In a request to debug a component, the circuit designer identifies the component and indicates a time period of the emulation to debug. The circuit designer's request can include a sampling rate that indicates how often states of debugged components should be saved by logic that traces signals.

The debug sub-system identifies one or more FPGAs of the emulator that are emulating the component using the information stored by the mapping sub-system in the storage sub-system. For each identified FPGA, the debug sub-system retrieves, from the storage sub-system, interface signals traced by the trace and injection logic of the FPGA during the time period indicated by the circuit designer. For example, the debug sub-system retrieves states traced by the trace and injection logic that are associated with the time period.

The debug sub-system transmits the retrieved interface signals to the emulator. The debug sub-system instructs the debug sub-system to use the identified FPGAs and for the trace and injection logic of each identified FPGA to inject its respective traced signals into logic of the FPGA to re-emulate the component for the requested time period. The debug sub-system can further transmit the sampling rate provided by the circuit designer to the emulator so that the tracing logic traces states at the proper intervals.

To debug the component, the emulator can use the FPGAs to which the component has been mapped. Additionally, the re-emulation of the component can be performed at any point specified by the circuit designer.

For an identified FPGA, the debug sub-system can transmit instructions to the emulator to load multiple emulator FPGAs with the same configuration of the identified FPGA. The debug sub-system additionally signals the emulator to use the multiple FPGAs in parallel. Each FPGA from the multiple FPGAs is used with a different time window of the interface signals to generate a larger time window in a shorter amount of time. For example, the identified FPGA can require an hour or more to use a certain amount of cycles. However, if multiple FPGAs have the same data and structure of the identified FPGA and each of these FPGAs runs a subset of the cycles, the emulator can require a few minutes for the FPGAs to collectively use all the cycles.

A circuit designer can identify a hierarchy or a list of DUT signals to re-emulate. To enable this, the debug sub-system determines the FPGA needed to emulate the hierarchy or list of signals, retrieves the necessary interface signals, and transmits the retrieved interface signals to the emulator for re-emulation. Thus, a circuit designer can identify any element (e.g., component, device, or signal) of the DUT to debug/re-emulate.

The waveform sub-system generates waveforms using the traced signals. If a circuit designer requests to view a waveform of a signal traced during an emulation run, the host system retrieves the signal from the storage sub-system. The waveform sub-system displays a plot of the signal. For one or more signals, when the signals are received from the emulator, the waveform sub-system can automatically generate the plots of the signals.

FIG. 4 is a flowchart 400 for a method of preemptive stoppage of local FPGA clocks for processing blocking tasks in accordance with some embodiments of the present disclosure. Alternative embodiments may include more, fewer, or different steps from those illustrated in FIG. 4, and the steps may be performed in a different order from that illustrated in FIG. 4. These steps may be performed by an emulation system (e.g., emulation system 302). Additionally, each of these steps may be performed automatically by the emulation system without human intervention.

An emulation system may run an emulation. During the emulation, the emulation system may receive at 410 a blocking task at a system clock cycle, K, of a system clock of the emulation system. The emulation system may receive the blocking task at a first FPGA (e.g., client FPGA 105*a*) of a plurality of FPGAs of the emulation system.

The emulation system prior to the first FPGA calling the blocking task, may determine at 420 an amount of delay, N, associated with the blocking task.

The emulation system performs at 430 operations to communicate a stop clock instruction to each of a set of FPGAs of the plurality of FPGAs such that each of the design clocks of each of the set of FPGAs are stopped in unison at a clock cycle of K+N. For example, the first FPGA may communicate a stop clock request to a control FPGA of the emulations system. The control FPGA may generate a stop clock instruction, and communicate the stop clock instruction to the one or more FPGAs (e.g., client FPGAs, and in some cases may include a control FPGA) that form the set of FPGAs. The FPGAs within the emulation system include one or more shift register configured to act as shift register barriers that function to delay FPGA-to-FPGA communication. For example, shift register delays (e.g., from shift register barriers) and pathway delays between FPGAs delay FPGA-to-FPGA communication such that the design clocks of each of the set of FPGAs stop in unison at a system clock cycle of K+N.

The emulation system calls at 440 the blocking task at a system clock cycle of K+N+1. For example, the first FPGA calls the blocking task at the system clock cycle of K+N+1, which is one clock cycle after all of the set of FPGAs stopped their respective design clocks.

Note that in this manner, the emulation system is able to call the blocking task in 1 clock cycle—while using multiple previous clock cycles to preemptively stop the design clocks. In contrast, conventional emulation systems, on receipt of a blocking task, are configured to stop the design clocks of affected FPGAs in a single system clock cycle, and execute the blocking task in the next system clock cycle—which can make the clock control network a performance bottleneck, especially for large and/or complex emulation systems.

In some aspects, the techniques described herein relate to a method including: receiving, at a first FPGA of a plurality of FPGAs of an emulation system, a blocking task at a system clock cycle, K, of a system clock of the emulation system; prior to the first FPGA calling the blocking task, determining an amount of delay, N, associated with the blocking task, and performing operations to communicate a stop clock instruction to each of a set of FPGAs of the plurality of FPGAs such that design clocks of each of the set of FPGAs are stopped in unison at a system clock cycle of K+N, and calling the blocking task at a system clock cycle of K+N+1.

In some aspects, the techniques described herein relate to a non-transitory computer readable medium including stored instructions, which when executed by a processor of an emulation system, cause the emulation system to: receive, at a first FPGA of a plurality of FPGAs of the emulation system, a blocking task at a system clock cycle, K, of a system clock of the emulation system; prior to the first FPGA calling the blocking task, determine an amount of delay, N, associated with the blocking task, and perform operations to communicate a stop clock instruction to each of a set of FPGAs of the plurality of FPGAs such that design clocks of each of the set of FPGAs are stopped in unison at a system clock cycle of K+N, and call the blocking task at a system clock cycle of K+N+1.

In some aspects, the techniques described herein relate to an emulation system including: a plurality of FPGAs that includes a first FPGA and a second FPGA; a system clock; a memory storing instructions; and a processor, coupled with the memory and to execute the instructions, the instructions when executed cause the emulation system to: receive, at the first FPGA, a blocking DPI call at a system clock cycle, K, of the system clock, prior to the first FPGA calling the blocking DPI call, determine an amount of delay, N, associated with the blocking DPI call, and perform operations to communicate a stop clock instruction to the second FPGA such that a design clock of the second FPGA is configured to stop at a clock cycle of K+N, and call the blocking DPI call at a system clock cycle of K+N+1.

Figure 5:
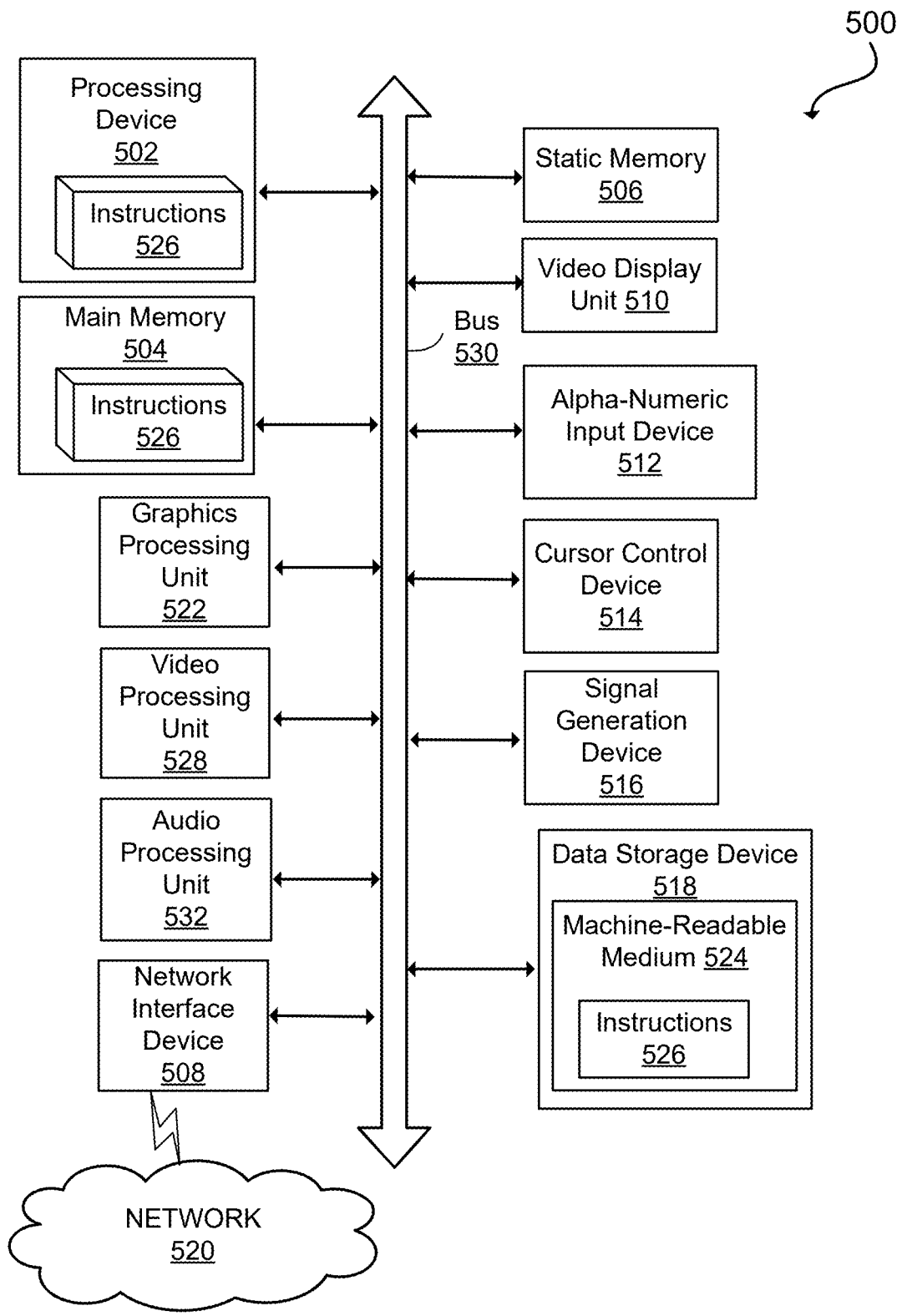
FIG. 5 depicts a diagram of an example computer system in which embodiments of the present disclosure may operate.

FIG. 5 illustrates an example machine of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed)

network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM), a static memory 506 (e.g., flash memory, static random access memory (SRAM), etc.), and a data storage device 518, which communicate with each other via a bus 530.

Processing device 502 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 may be configured to execute instructions 526 for performing the operations and steps described herein. For example, the processes described in FIGS. 1 through 4 may be embodied as instructions executable by one or more processing devices 502 (or processing system).

The computer system 500 may further include a network interface device 508 to communicate over the network 520. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), a graphics processing unit 522, a signal generation device 516 (e.g., a speaker), graphics processing unit 522, video processing unit 528, and audio processing unit 532.

The data storage device 518 may include a machine-readable storage medium 524 (also known as a non-transitory computer-readable medium) on which is stored one or more sets of instructions 526 or software embodying any one or more of the methodologies or functions described herein. The instructions 526 may also reside, completely or at least partially, within the main memory 504 and/or within the processing device 502 during execution thereof by the computer system 500, the main memory 504 and the processing device 502 also constituting machine-readable storage media.

In some implementations, the instructions 526 include instructions to implement functionality corresponding to the present disclosure. While the machine-readable storage medium 524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 502 to perform any one or more of the methodologies of the present disclosure. The term "machine-readable storage medium" shall accordingly be taken to include, but not be limited to, solid-state memories, optical media, and magnetic media.

Figure 6:
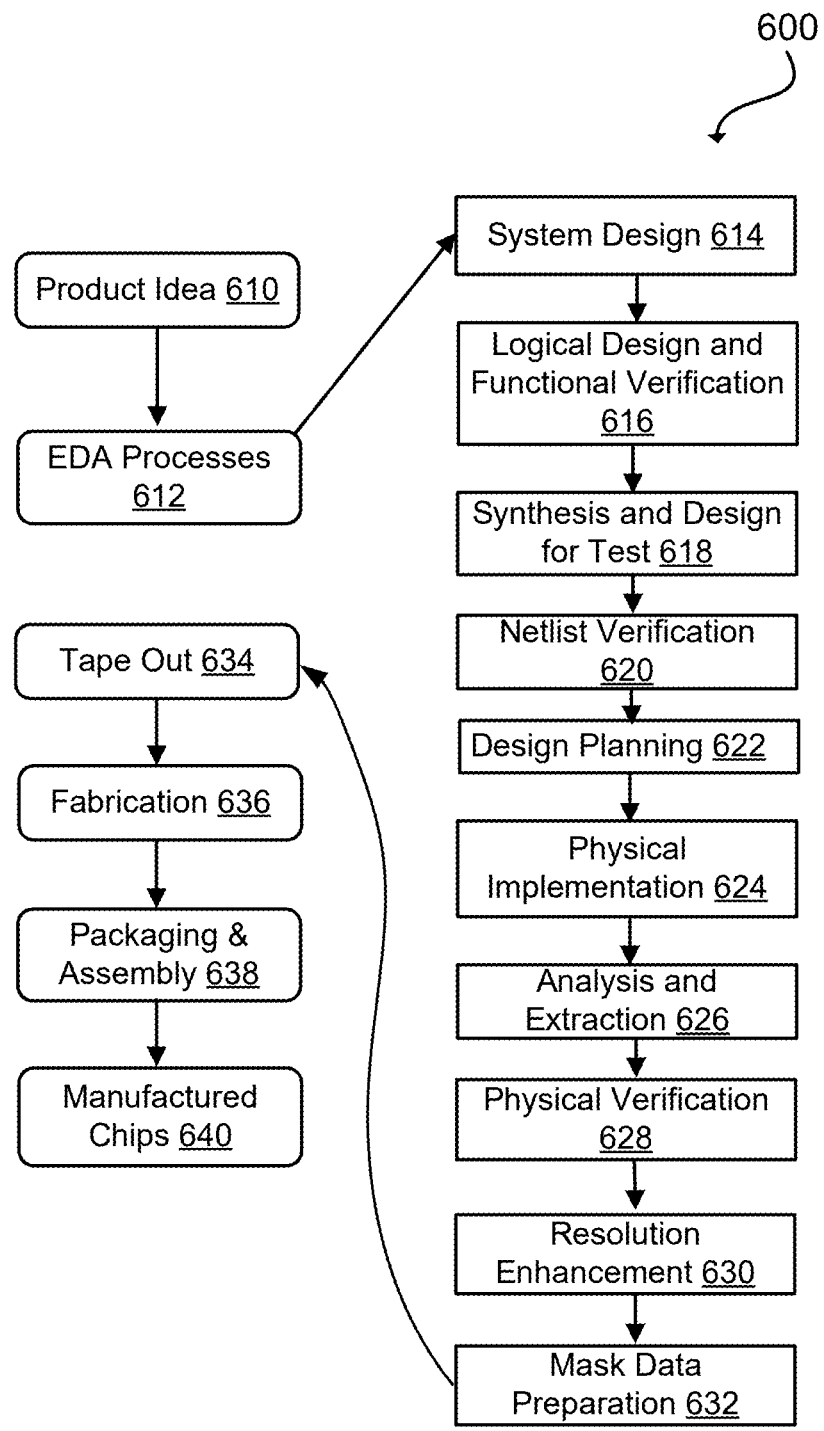
FIG. 6 depicts a flowchart of various processes used during the design and manufacture of an integrated circuit in accordance with some embodiments of the present disclosure.

FIG. 6 illustrates an example set of processes 600 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 610 with information supplied by a designer, information which is transformed to create an article of manufacture that uses a set of EDA processes 612. When the design is finalized, the design is taped-out 634, which is when artwork (e.g., geometric patterns) for the integrated circuit is sent to a fabrication facility to manufacture the mask set, which is then used to manufacture the integrated circuit. After tape-out, a semiconductor die is fabricated 636 and packaging and assembly processes 638 are performed to produce the finished integrated circuit 640.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 6. The processes described by be enabled by EDA products (or EDA systems).

During system design 614, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 616, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 618, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 620, the netlist is checked for compliance with timing constraints and for correspondence with the HDL code. During design planning 622, an overall floor plan for the integrated circuit is constructed and analyzed for timing and top-level routing.

During layout or physical implementation 624, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 626, the circuit function is verified at the layout level, which permits refinement of the layout design. During physical verification 628, the layout design is checked to ensure that manufacturing constraints are correct, such as DRC constraints, electrical constraints, lithographic constraints, and that circuitry function matches the HDL design specification. During resolution enhancement 630, the geometry of the layout is transformed to improve how the circuit design is manufactured.

During tape-out, data is created to be used (after lithographic enhancements are applied if appropriate) for production of lithography masks. During mask data preparation 632, the 'tape-out' data is used to produce lithography masks that are used to produce finished integrated circuits.

A storage subsystem of a computer system (such as computer system 500 of FIG. 5 or host system 307 of FIG. 3) may be used to store the programs and data structures that are used by some or all of the EDA products described herein, and products used for development of cells for the library and for physical and logical design that use the library.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
receiving, at a first field programable gate array (FPGA) of a plurality of FPGAs of an emulation system, a blocking task at a system clock cycle, K of the emulation system;
prior to the first FPGA calling the blocking task,
determining an amount of delay, N, associated with the blocking task, and
performing operations to communicate a stop clock instruction to each of a set of FPGAs of the plurality of FPGAs such that design clocks of each of the set of FPGAs are stopped in unison at a system clock cycle of K+N, and
calling the blocking task at a subsequent system clock cycle that is greater than K+N.

2. The method of claim 1, wherein performing operations to communicate the stop clock instruction to each of the set of FPGAs of the plurality of FPGAs such that the design clocks of each of the set of FPGAs are stopped in unison at the system clock cycle of K+N, further comprises:
generating a stop clock request at the first FPGA;
communicating the stop clock request to a control FPGA using a clock control path that includes a first shift register that introduces a first amount of delay in the control FPGA receiving the stop clock request, wherein the plurality of FPGAs includes the control FPGA and one or more client FPGAs; and
communicating the stop clock instruction from the control FPGA to a client FPGA of the set of FPGAs, using a clock control path that includes a second shift register that introduces a second amount of delay in the control FPGA receiving the stop clock request, such that the client FPGA stops a design clock of the client FPGA at a clock cycle of K+N.

3. The method of claim 2, wherein the first shift register is within the first FPGA and the second shift register is within the client FPGA, the method further comprising:
adjusting the first shift register to introduce the first amount of delay, the adjusting based in part on having a design clock of the client FPGA stopping at a clock cycle of K+N; and
adjusting the second shift register to introduce the second amount of delay, the adjusting based in part on having the design clock of the client FPGA stopping at the clock cycle of K+N.

4. The method of claim 3, wherein the second amount of delay is different from the first amount of delay.

5. The method of claim 4, wherein a path between the control FPGA and the first FPGA is shorter than a path between the control FPGA and the client FPGA.

6. The method of claim 1, wherein performing operations to communicate the stop clock instruction to each of the set of FPGAs of the plurality of FPGAs such that the design clocks of each of the set of FPGAs are stopped in unison at the system clock cycle of K+N, further comprises:
communicating a stop clock request from the first FPGA to a control FPGA, wherein the plurality of FPGAs includes the control FPGA and one or more client FPGAs; and
communicating the stop clock instruction from the control FPGA to the one or more client FPGAs,
wherein the plurality of FPGAs include a plurality of shift registers and pathways that delay FPGA-to-FPGA communication such that the design clocks of each of the set of FPGAs stop in unison at a clock cycle of K+N.

7. The method of claim 1, wherein determining the amount of delay, N, associated with the blocking task, further comprises:
receiving an instruction from a host system to set the amount of delay to N; and
setting shift register lengths in some or all of the plurality of FPGAs such that a total delay between receiving the blocking task and stopping design clocks of each of the set of FPGAs is K+N.

8. A non-transitory computer readable medium comprising stored instructions, which when executed by a processor of an emulation system, cause the emulation system to:
receive, at a first field programable gate array (FPGA) of a plurality of FPGAs of the emulation system, a blocking task at a system clock cycle, K, of a system clock of the emulation system;
prior to the first FPGA calling the blocking task,
determine an amount of delay, N, associated with the blocking task, and
perform operations to communicate a stop clock instruction to each of a set of FPGAs of the plurality of FPGAs such that design clocks of each of the set of FPGAs are stopped in unison at a system clock cycle of K+N, and
call the blocking task at a system clock cycle of K+N+1.

9. The non-transitory computer readable medium of claim 8, where the stored instructions to perform operations to communicate the stop clock instruction to each of the set of FPGAs of the plurality of FPGAs such that the design clocks of each of the set of FPGAs are stopped in unison at the system clock cycle of K+N, further comprises stored instructions that when executed cause the emulation system to:
generate a stop clock request at the first FPGA;
communicate the stop clock request to a control FPGA using a clock control path that includes a first shift register that introduces a first amount of delay in the control FPGA receiving the stop clock request, wherein the plurality of FPGAs includes the control FPGA and one or more client FPGAs; and
communicate the stop clock instruction from the control FPGA to a client FPGA of the set of FPGAs, using a clock control path that includes a second shift register that introduces a second amount of delay in the control FPGA receiving the stop clock request, such that the client FPGA stops a design clock of the client FPGA at a clock cycle of K+N.

10. The non-transitory computer readable medium of claim 9, wherein the first shift register is within the first FPGA and the second shift register is within the client FPGA, and the non-transitory computer readable medium further comprises stored instructions, that when executed cause the emulation system to:
adjust the first shift register to introduce the first amount of delay, the adjusting based in part on having a design clock of the client FPGA stopping at a clock cycle of K+N; and
adjust the second shift register to introduce the second amount of delay, the adjusting based in part on having the design clock of the client FPGA stopping at the clock cycle of K+N.

11. The non-transitory computer readable medium of claim 9, wherein the second amount of delay is different from the first amount of delay.

12. The non-transitory computer readable medium of claim 11, wherein a path between the control FPGA and the first FPGA is shorter than a path between the control FPGA and the client FPGA.

13. The non-transitory computer readable medium of claim 8, where the stored instructions to perform operations to communicate the stop clock instruction to each of the set of FPGAs of the plurality of FPGAs such that the design clocks of each of the set of FPGAs are stopped in unison at the system clock cycle of K+N, further comprises stored instructions that when executed cause the emulation system to:
communicate a stop clock request from the first FPGA to a control FPGA, wherein the plurality of FPGAs includes the control FPGA and one or more client FPGAs; and
communicate the stop clock instruction from the control FPGA to the one or more client FPGAs,
wherein the plurality of FPGAs include a plurality of shift registers and pathways that delay FPGA-to-FPGA communication such that the design clocks of each of the set of FPGAs stop in unison at a clock cycle of K+N.

14. The non-transitory computer readable medium of claim 8, where the stored instructions to determine the amount of delay, N, associated with the blocking task, further comprises stored instructions that when executed cause the emulation system to:
receive an instruction from a host system to set the amount of delay to N; and
set shift register lengths in some or all of the plurality of FPGAs such that a total delay between receiving the blocking task and stopping design clocks of each of the set of FPGAs is K+N.

15. An emulation system comprising:
a plurality of field programable gate arrays (FPGAs) that includes a first FPGA and a second FPGA;
a system clock;
a memory storing instructions; and
a processor, coupled with the memory and to execute the instructions, the instructions when executed cause the emulation system to:
receive, at the first FPGA, a blocking direct programming interface (DPI) call at a system clock cycle, K, of the system clock,
prior to the first FPGA calling the blocking DPI call, determine an amount of delay, N, associated with the blocking DPI call, and
perform operations to communicate a stop clock instruction to the second FPGA such that a design clock of the second FPGA is configured to stop at a clock cycle of K+N, and
call the blocking DPI call at a system clock cycle of K+N+1.

16. The emulation system of claim 15, further comprising:
a control FPGA of the plurality of FPGAs;
a first shift register; and
a second shift register,
wherein the stored instructions to perform operations to communicate the stop clock instruction to the second FPGA such that the design clock of the second FPGA is configured to stop at the clock cycle of K+N, further comprises stored instructions that when executed cause the emulation system to:
generate a stop clock request at the first FPGA;
communicate the stop clock request to a control FPGA using a clock control path that includes the first shift register and introduces a first amount of delay in the control FPGA receiving the stop clock request; and
communicate the stop clock instruction from the control FPGA to the second FPGA, using a clock control path that includes the second shift register that introduces a second amount of delay in the control FPGA receiving the stop clock request, such that the second FPGA stops a design clock of the second FPGA at a clock cycle of K+N.

17. The emulation system of claim 16, wherein the first shift register is within the first FPGA and the second shift register is within the second FPGA, and the memory further comprising stored instructions, that when executed cause the emulation system to:
adjust the first shift register to introduce the first amount of delay, the adjusting based in part on having a design clock of the second FPGA stopping at a clock cycle of K+N; and
adjust the second shift register to introduce the second amount of delay, the adjusting based in part on having the design clock of the second FPGA stopping at the clock cycle of K+N.

18. The emulation system of claim 17, wherein the second amount of delay is different from the first amount of delay.

19. The emulation system of claim 17, wherein a path between the control FPGA and the first FPGA is shorter than a path between the control FPGA and the second FPGA.

20. The emulation system of claim 16, where the stored instructions to determine the amount of delay, N, associated with the blocking DPI call, further comprises stored instructions that when executed cause the emulation system to:
receive an instruction from a host system to set the amount of delay to N; and
set shift register lengths in the first shift register and the second shift register such that a total delay between receiving the blocking DPI call and stopping the design clock of the second FPGA is K+N.

* * * * *